United States Patent
Wei et al.

(10) Patent No.: US 12,100,244 B2
(45) Date of Patent: Sep. 24, 2024

(54) SEMI-SUPERVISED ACTION-ACTOR DETECTION FROM TRACKING DATA IN SPORT

(71) Applicant: STATS LLC, Chicago, IL (US)

(72) Inventors: Xinyu Wei, Melbourne (AU); Jennifer Hobbs, Chicago, IL (US); Long Sha, Brisbane (AU); Patrick Joseph Lucey, Chicago, IL (US); Sujoy Ganguly, Chicago, IL (US)

(73) Assignee: Stats LLC, Chicago, IL (US)

( * ) Notice: Subject to any disclaimer, the term of this patent is extended or adjusted under 35 U.S.C. 154(b) by 344 days.

(21) Appl. No.: 17/303,365

(22) Filed: May 27, 2021

(65) Prior Publication Data
US 2021/0374419 A1      Dec. 2, 2021

Related U.S. Application Data

(60) Provisional application No. 63/033,570, filed on Jun. 2, 2020.

(51) Int. Cl.
*G06K 9/00* (2022.01)
*G06F 18/21* (2023.01)
(Continued)

(52) U.S. Cl.
CPC ............ *G06V 40/20* (2022.01); *G06F 18/214* (2023.01); *G06F 18/217* (2023.01); *G06N 3/045* (2023.01);
(Continued)

(58) Field of Classification Search
CPC ........ G06V 40/20; G06V 20/52; G06V 20/46; G06V 10/82; G06V 20/42; G06F 18/217; G06F 18/214; G06N 3/045; G06N 3/08
See application file for complete search history.

(56) References Cited

U.S. PATENT DOCUMENTS

2005/0143198 A1*  6/2005  Charge ............... A63B 24/0021
                                                                          473/422
2011/0169959 A1*  7/2011  DeAngelis ............... G06T 7/70
                                                                          348/157
(Continued)

OTHER PUBLICATIONS

Lin, Yujie, et al. "Explainable outfit recommendation with joint outfit matching and comment generation." IEEE Transactions on Knowledge and Data Engineering 32.8 (2019): 1502-1516.*
(Continued)

*Primary Examiner* — Edward F Urban
*Assistant Examiner* — Jongbong Nah
(74) *Attorney, Agent, or Firm* — Bookoff McAndrews, PLLC

(57) ABSTRACT

A method and system of generating agent and actions prediction based on multi-agent tracking data are disclosed herein. A computing system retrieves tracking data from a data store. The computing system generates a trained neural network by generating a plurality of training data sets based on the tracking data by converting each frame of data into a matrix representation of the data contained in the frame and learning, by the neural network, a start frame and end frame of each action contained in the frame and its associated actor. The computing system receives target tracking data associated with an event. The target tracking data includes a plurality of actors and a plurality of actions. The computing system generates, via the trained neural network, a target start frame and a target end frame of each action identified in the tracking data and a corresponding actor.

20 Claims, 8 Drawing Sheets

(51) Int. Cl.
    *G06F 18/214*     (2023.01)
    *G06K 9/62*     (2022.01)
    *G06N 3/04*     (2023.01)
    *G06N 3/045*     (2023.01)
    *G06N 3/08*     (2023.01)
    *G06V 10/82*     (2022.01)
    *G06V 20/40*     (2022.01)
    *G06V 20/52*     (2022.01)
    *G06V 40/20*     (2022.01)

(52) U.S. Cl.
    CPC ............... *G06N 3/08* (2013.01); *G06V 10/82* (2022.01); *G06V 20/42* (2022.01); *G06V 20/46* (2022.01); *G06V 20/52* (2022.01)

(56) References Cited

U.S. PATENT DOCUMENTS

2014/0236331 A1* 8/2014 Lehmann ........... G09B 19/0038
                                                                                                      700/91
2017/0080336 A1* 3/2017 Groset ................... A63F 13/35
2019/0180149 A1* 6/2019 Knittel .................. G06V 40/20
2021/0263964 A1* 8/2021 Nasir ................. G06F 18/2413

OTHER PUBLICATIONS

Lin, Yujie, et al. "Explainable outfit recommendation with joint outfit matching and comment generation." IEEE Transactions on Knowledge and Data Engineering 32.8 (2019): 1502-1516. (Year: 2019).*

PCT International Application No. PCT/US21/34573, International Search Report and Written Opinion of the International Searching Authority, dated Sep. 10, 2021, 13 pages.

Lin, et al., "Explainable outfit recommendation with joint outfit matching and comment generation," IEEE Transactions on Knowledge and Data Engineering, 32.8, Mar. 5, 2019, pp. 1502-1516.

Ramanathan, et al., "Detecting events and key actors in multi-person videos," Proceedings of the IEEE conference on computer vision and pattern recognition, 2016, pp. 3043-3053.

Rezaei, et al., "Target-specific action classification for automated assessment of human motor behavior from video," Sensors, 19.19, 2019, pp. 4266-4283.

* cited by examiner

SEMI-SUPERVISED ACTION-ACTOR DETECTION FROM TRACKING DATA IN SPORT

CROSS-REFERENCE TO RELATED APPLICATIONS

This application claims priority to U.S. Provisional Application Ser. No. 63/033,570, filed Jun. 2, 2020, which is hereby incorporated by reference in its entirety.

FIELD OF THE DISCLOSURE

The present disclosure generally relates to system and method for predicting actions and actors, based on, for example, tracking data.

BACKGROUND

When human behavior and human-to-human interactions are described, they are typically described as a sequence of activities or actions performed by specific actions, implying that the natural semantics of human behavior may be captured by understanding a series of actor-action pairs. Conventional approaches in the area of human activity recognition has involved computer vision. Such approaches primarily focused on top-down methods, in which videos of actions are used to predict actions in the scene at a frame level. While this approach may be useful for video tagging, such techniques are limited to performing action recognition in the image space, while the actual activity occurs in real-world coordinates. Action recognition in the image space, however, also comes with additional challenges, such as background clutter, viewpoint change, and irregular camera motion. The identification of actors involved is significantly more difficult in these top-down approaches.

SUMMARY

Embodiments disclosed herein generally relate to a system and method for generating, scoring, and presenting in-game insights to users, based on, for example, event data. In some embodiments, a method of generating agent and actions prediction based on multi-agent tracking data is disclosed herein. A computing system retrieves tracking data from a data store. The tracking data includes a plurality of frames of data for a plurality of events across a plurality of seasons. The computing system generates a trained neural network, by generating a plurality of training data sets based on the tracking data by converting each frame of data into a matrix representation of the data contained in the frame and learning, by the neural network, a start frame and end frame of each action contained in the frame and its associated actor. The computing system receives target tracking data associated with an event. The target tracking data includes a plurality of actors and a plurality of actions. The computing system converts the tracking data into a matrix representation of the tracking data. The computing system generates, via the trained neural network, a target start frame and a target end frame of each action identified in the tracking data and a corresponding actor. The computing system presents the target start frame, target end frame, and associated actor to one or more end users.

In some embodiments, a system is disclosed herein. The system includes a processor and a memory. The memory includes programming instructions stored thereon, which, when executed by the processor, performs one or more operations. The one or more operations include retrieving tracking data from a data store. The tracking data includes a plurality of frames of data for a plurality of events across a plurality of seasons. The one or more operations further include generating a trained neural network, by generating a plurality of training data sets based on the tracking data by converting each frame of data into a matrix representation of the data contained in the frame and learning, by the neural network, a start frame and end frame of each action contained in the frame and its associated actor. The one or more operations further include receiving target tracking data associated with an event. The target tracking data includes a plurality of actors and a plurality of actions. The one or more operations further include converting the tracking data into a matrix representation of the tracking data. The one or more operations further include generating, via the trained neural network, a target start frame and a target end frame of each action identified in the tracking data and a corresponding actor. The one or more operations further include presenting the target start frame, target end frame, and associated actor to one or more end users.

In some embodiments, a non-transitory computer readable medium is disclosed herein. The non-transitory computer readable medium includes one or more sequences of instructions that, when executed by one or more processors, causes one or more operations. The one or more operations include retrieving tracking data from a data store. The tracking data includes a plurality of frames of data for a plurality of events across a plurality of seasons. The one or more operations further include generating a trained neural network, by generating a plurality of training data sets based on the tracking data by converting each frame of data into a matrix representation of the data contained in the frame and learning, by the neural network, a start frame and end frame of each action contained in the frame and its associated actor. The one or more operations further include receiving target tracking data associated with an event. The target tracking data includes a plurality of actors and a plurality of actions. The one or more operations further include converting the tracking data into a matrix representation of the tracking data. The one or more operations further include generating, via the trained neural network, a target start frame and a target end frame of each action identified in the tracking data and a corresponding actor. The one or more operations further include presenting the target start frame, target end frame, and associated actor to one or more end users.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
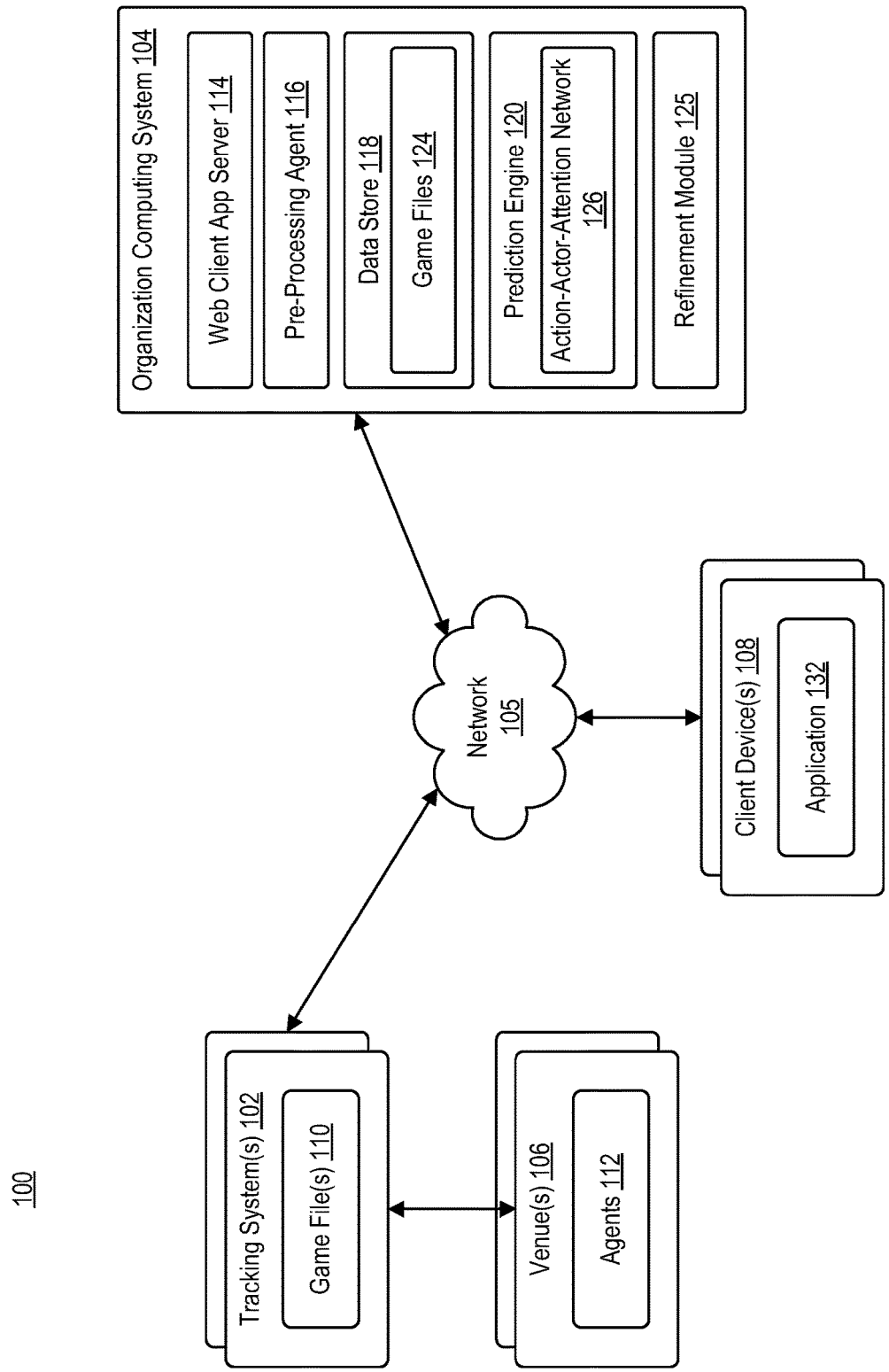
FIG. 1 is a block diagram illustrating a computing environment, according to example embodiments.

One or more techniques disclosed herein generally relate to a system and method for predicting action and actors from multi-agent tracking data. For example, given tracking data from a sporting event (e.g., basketball game), the one or more techniques discussed herein, are able to predict the start frame and end frame of each action, as well as its associated actor. Such prediction is possible due to the novel network architecture disclosed herein. For example, the disclosed network architecture may use spatial attention, convolutional streams for action and actor recognition, and a mutual attention layer that allows for information sharing between two tasks.

Detecting, understanding, and analyzing actions (e.g. shot, pass, dribble, save, tackle, etc.) occurring in a sporting event are fundamental to an understanding of the game itself. Historically, these events and the actors/agents participating in those events (e.g. the player who is taking the shot) had to be labeled via manual, human annotation. With tracking data, systems are able to identity (i.e., detect) these events and their associated agents directly from the motions of the players and ball. Previous approaches relied on heuristics (i.e., rules—a series of if-then statements) or simplistic machine learning approaches. These conventional approaches (particularly the manual annotation approach) are limited to only being able identify the onset of an event (e.g., the frame in which the shot was released from the shooter's hand).

One or more approaches described herein improves upon conventional systems by not only being able to identify the onset of an event, but also the full duration of the event as well as the agent who is the primary actor of that event. For example, in each frame, in addition to knowing the locations of all the players and the ball, the system is now able to provide the user with a label indicating what event is occurring and who is involved. Additionally, because the system is now able to predict the duration of an event, the one or more techniques described herein also provide richer descriptions of the event (e.g., how long a player dribbles).

Further, typically to perform dense action recognition (i.e., to assign an event in every frame as opposed to at the offset), conventional system usually requires dense labels (i.e. someone has provided frame-level annotation) to train their prediction models. In contrast, the one or more techniques described herein only uses a sparse event-sequence. This enables the system to leverage the vast amounts of historical sparse event sequences that exists to learn this dense labeling.

As provided above, conventional top-down approaches to human activity recognition suffer from a series of limitations. In contrast, the one or more techniques discussed herein take a bottom-up approach to such prediction, by using, as input, the tracking (i.e., the trajectories) of multiple agents. By directly using multi-agent tracking data, the system can now focus on inter-class variability in human motion for a given action, as well as the challenge of understanding the human-human and human-object interactions. Additionally, since the set of potentially relevant agents may already be identified in multi-agent tracking, using it as an input representation may simplify the problem of identifying the actors to that of classification. Accordingly, one or more techniques disclosed herein state the task of action recognition as a sequence to sequence labeling problem, in which the system uses optically derived multi-agent tracking data, and predict the frame level action-actor pair.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, and prediction engine 120. Each of pre-processing agent 116 and prediction engine 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match. Generally, such information may be referred to herein as "tracking data."

Pre-processing agent 116 may be configured to process data retrieved from data store 118. For example, pre-processing agent 116 may be configured to generate one or more sets of information that may be used to action-actor-attention network 126 associated with prediction engine 120.

Prediction engine 120 may be configured to predict actions and actors from retrieved tracking data. For example, given tracking data from a frame, prediction engine 120 may include a trained prediction model that is able to predict the start frame and end frame of each action and its associated actor. Prediction engine 120 may include action-actor-attention network 126, action-actor-attention network 126 may be configured to receive, as input, a frames of tracking data that includes a set of a set of actor/agents/players being observed over a certain period of time, with a given set of trajectories. Given this tracking data, action-actor-attention network 126 may generate final action and actor labels. Prediction engine 120 and action-actor-attention network 126 are discussed in more detail below, in conjunction with FIGS. 2-3B.

In some embodiments, action-actor-attention network 126 may be configured to receive, as input, a live feed of tracking data from tracking system 102. In some embodiments, the tracking data may include raw positional data of all agents and/or objects on the playing surface. In some embodiments, prediction engine 120 may be configured to read in raw positional data of each agent so that action-actor-attention network 126 may provide frame-level detection outputs. In some embodiments, pre-processing agent 116 may be configured to process the tracking data prior to being input to action-actor-attention network 126 so that player position data may be provided as input to action-actor-attention network 126 with the positional data.

In some embodiments, prediction engine 120 may fuse together the raw tracking data with actions/events annotated by a human or by another computing system.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
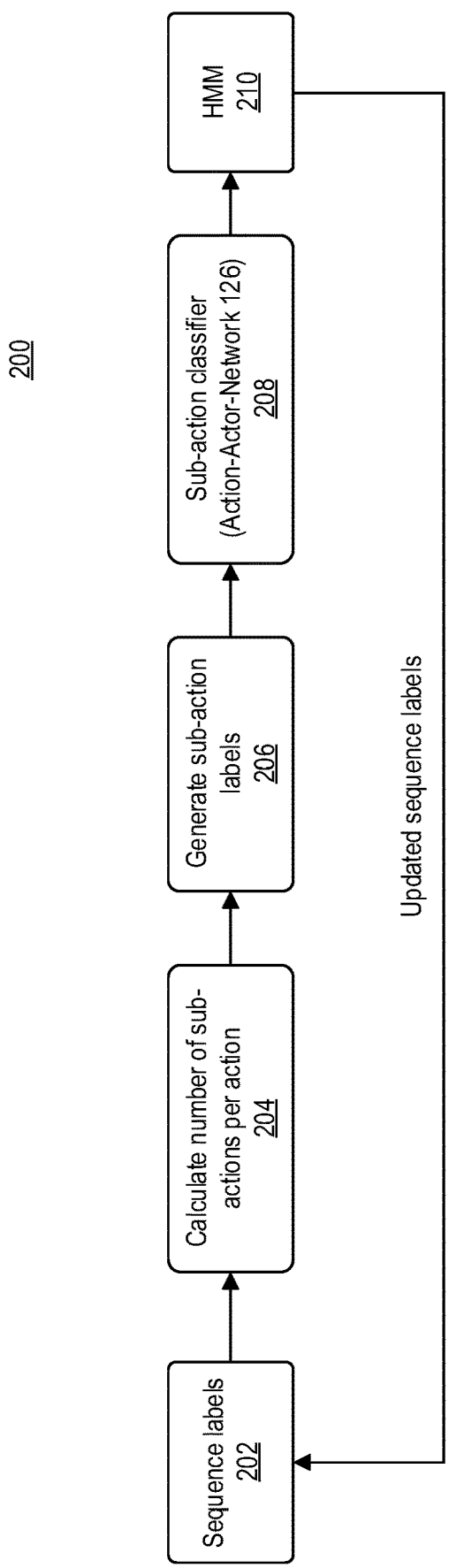
FIG. 2 is a block diagram illustrating framework for weakly supervised learning of actions, according to example embodiments.

FIG. 2 is a block diagram illustrating framework 200 for weakly supervised learning of actions, according to example embodiments. To determine action-actor pairs from multi-agent tracking data, the problem may be framed as a sequence to sequence learning problem. For example, the set of C interacting agents may be observed to move over the time range $[t_0, t_f]$ with the trajectories $X_C^{[t_0,t_f]} = \{X_i^{[t_0,t_f]}\} | \cup i \in C$. The trajectory of the $i^{th}$ agent may be defined as $X_i^{[t_0,t_f]} = \{x_i^{t_0}, x_i^{t_0+1}, \ldots, x_i^{t_f}\}$, where $x_i^t$ may represent the two-dimensional coordinates of agent i at time t, $(x_i^t, y_i^t)$. From $X_C^{[t_0,t_f]}$, prediction engine 120 may predict $Y^{[t_0,t_f]} = \{a^{[t_0,t_f]}, b^{[t_0,t_f]}\} = \{\{a^{t_0}, a^{t_0+1}, \ldots a^{t_f}\}, \{b^{t_0}, b^{t_0+1}, \ldots b^{t_f}\}\}$, where $a^t$ and $b^t$ may be one-hot encoded vectors representing the action and actor at time t, respectively. The number of elements of b may be the same as the number of elements in C.

Because the dataset may have noisy start frame labels for action-actor pairs, a weakly supervised training method may be implemented, which may predict the action order and optimal frame alignment given the ground truth order of labels (block 202). For example, prediction engine 120 may take a sequence of tracking and ordered action-actor pairs $\{X_C^{[t_0,t_f]}, Y^N\}$, where $Y^N = \{Y_1, y_2, \ldots, Y_N\}$ may be the set of actions that occur during the time frame $[t_0, t_f]$. Generically, there may exist a mapping function from n(t): $\{1, \ldots, T\} \rightarrow \{1, \ldots, N\}$. However, because actions may have vastly different durations, prediction engine 120 may regularize the mapping function to map a set of sub-actions of specified duration to the sequence order $$s(t):\{1,\ldots,T\} \rightarrow \{s_1^{a_1},\ldots,s_{K_{a_N}}^{Y_N}\}$$

(e.g., blocks 204, 206). In other words, every action $a_i$ may be made up of K sub-actions. Because the action and actors are paired, prediction engine 120 may only need a mapping function for the actions. Then, prediction engine 120 may define the likelihood of generating the configuration of agent positions $X_C^t$ given the action-actor sequence $a^N$ as $$p(X_C^t \mid a^N) := \prod_{t=t_0}^{t_f} p\{X_C^t \mid s(t)\} p\{s(t) \mid s(t-1)\}$$

where $p(X_C^t|s(t))$ is the likelihood that sub-action s(t) generates configuration $X_C^t$ and $p(s(t)|s(t-1))$ is the likelihood of sub-action s(t) following sub-action s(t-1) (e.g., block 208). Because prediction engine 120 may prescribe the sub-action to action-actor mapping functions $S:x(t) \rightarrow a^N$, then the optimal action-actor sequence and the frame alignment may be determined by:

$$\hat{a}^N = \underset{s(t):S}{\operatorname{argmax}} \prod_{t=t_0}^{t_f} p\{X_C^t \mid s(t)p\{s(t) \mid s(t-1)\}$$

which may be solved using Viterbi algorithm (e.g., block 210). Accordingly, the task for action-actor-attention network 126 may be to predict the frame level sub-action label s(t) given the configuration $X_C^t$.

In some embodiments, prediction engine 120 may generate a matrix representation for XL where rows may correspond to agents and columns may correspond to time. Agents may be ordered first by agent-class: home, away, ball. For a given agent-class, agents may be ordered by their average y-coordinate (small to large) with ties broken by their average x-coordinate (small to large). For a given agent, the x-coordinate may be the first row and the y-coordinate may be the second row.

Figure 3A:
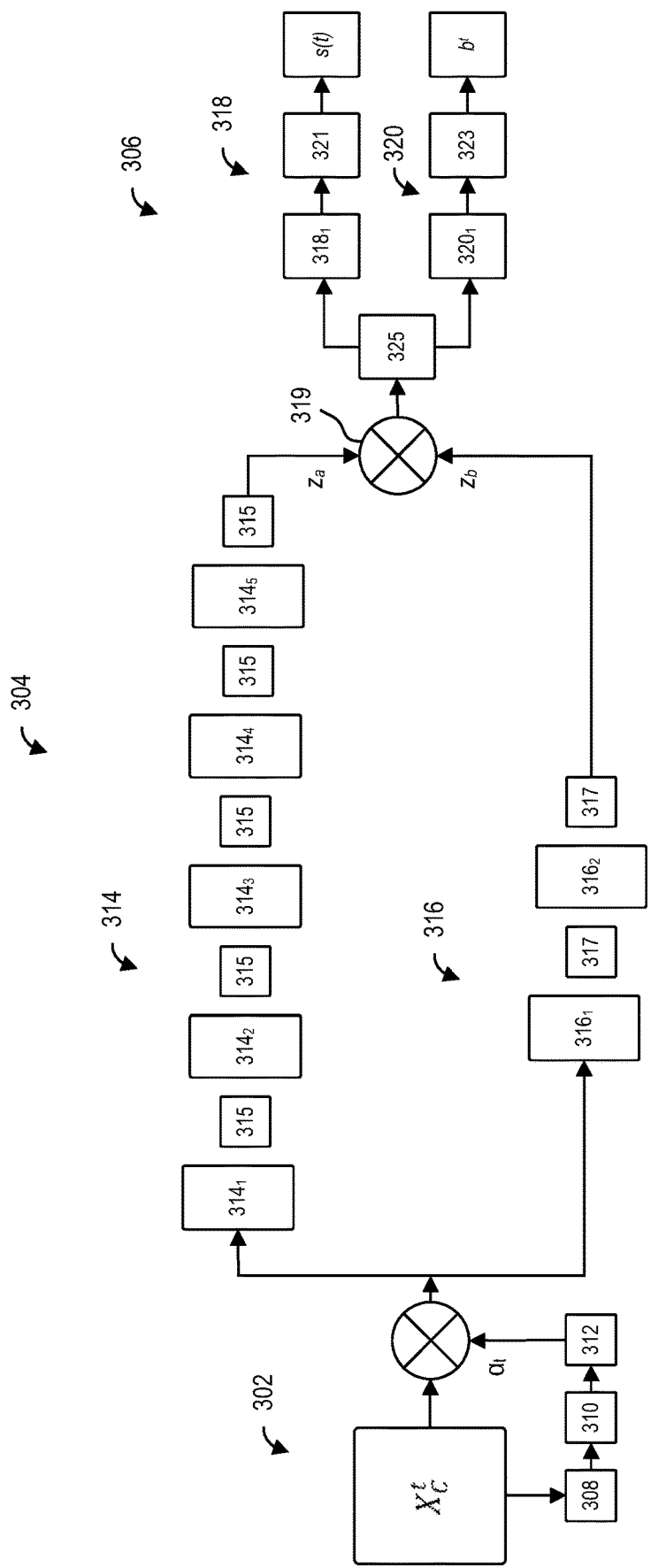
FIG. 3A is a block diagram illustrating action-actor-attention network, according to example embodiments.

FIG. 3A is a block diagram illustrating action-actor-attention network 126, according to example embodiments. As illustrated, action-actor-attention network 126 may include a spatial attention sub-network 302, a per-agent convolution network 304, and a mutual attention sub-network 306.

Spatial attention sub-network 302 may include one or more fully-connected layers 308, 310, and a softmax layer 312. In some embodiments, fully-connected layer 308 may include 32 nodes or neurons. In some embodiments, fully-connected layer 310 may include 22 nodes or neurons. As illustrated, spatial attention sub-network 302 may receive, as input, $X_C^t$ and outputs spatial attention coefficients $\alpha_t$.

Per-agent convolution network 304 may include two parallel convolutional streams. Two parallel convolutional streams may include a first convolutional stream 314 and a second convolutional stream 316. In some embodiments, per-agent convolution network 304 may receive, as input, a weighted spatiotemporal matrix $\tilde{X}_C^t = \alpha_t \odot X_C^t$ may be fed into first convolutional stream 314 and second convolutional stream 316. In some embodiments, first convolutional layer of each of first convolutional stream 314 and second convolutional stream 316 may have a kernel size of 2 and a stride of 2 in the agent dimension. Thus, the dimension of the first hidden layer in each stream 314, 316 may have agent-dimension C. All subsequent convolutions in each stream 314, 316 may have an agent-dimensional kernel of 1 and agent-dimension stride of 1. Accordingly, prediction engine 120 may be able to maintain a per-agent representation throughout per-agent convolution network 304. As output, convolutional stream 314 may generate $z_a$ and $z_b$. In some embodiments, $z_a$ and $z_b$ may represent latent feature representations learned by the two convolutional streams.

For example, as shown, first convolutional stream 314 may include a first convolutional layer 314$_1$ having a dimension of 2×7, 256 filters, and a stride of two, a second convolutional layer 314$_2$ having a dimension 1×7, 256 filters, a stride of one, and a dilation of two; a third convolutional layer 314$_3$ having a dimension 1×7, 256 filters, and a stride of one; a fourth convolutional layer 314$_4$ having a dimension 1×7, 256 filters, and a stride of one; and a fifth convolutional layer 314$_5$ having a dimension 1×7, 256 filters, and a stride of one. In some embodiments, each convolutional layer 314$_1$-314$_5$ may be followed by an activation function 315. For example, activation function 315 may be a rectified linear activation function (ReLU). First convolutional stream 314 may output $z_a$.

Continuing with the above example, as shown, second convolutional stream 316 may include a first convolutional layer 316$_1$ having a dimension of 2×7, 256 filters, and a stride of two and a second convolutional layer 316$_2$ having a dimension 1×7, 256 filters, and a stride of one. In some embodiments, each convolutional layer 316$_1$-316$_2$ may be followed by an activation function 317. For example, activation function 317 may be a ReLU activation function. Second convolutional stream 316 may output $z_b$. Mutual attention sub-network 306 may take $z_a$ and $z_b$, as input, and combine them into a single manifold, i.e., $z = z_a \odot z_b$, where $\odot$ may denote the Hadamard product. This single manifold may be referred to as a mutual attention layer (e.g., mutual attention layer 319). Output from mutual attention layer 319 may be provided to a fully connected layer 325. For example, fully connected layer 325 may have a filter of 256. Mutual attention sub-network 306 may further include two separate multilayer perceptrons 318, 320. The generated single manifold may be passed through both multilayer perceptron 318 and multilayer perceptron 320. For example, multilayer perceptron 318 may generate an actor prediction, and multilayer perceptron 320 may generate an action prediction, or vice versa.

As shown, multi-layer perceptron 318 may include a first fully connected layer 318$_1$ followed by a softmax activation function 321; multi-layer perceptron 320 may include a first fully connected layer 320$_1$ followed by a softmax activation function 323. As output, multilayer perceptron 318 may generate s(t) and multilayer perceptron 320 may generated $b^t$.

Figure 3B:
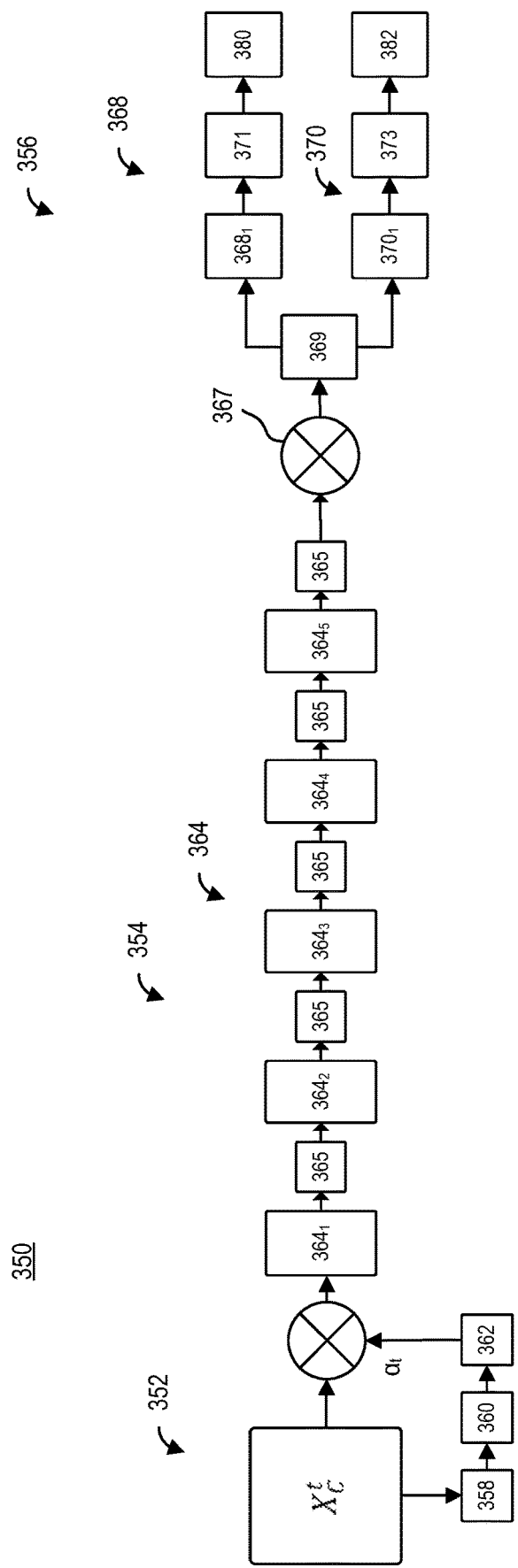
FIG. 3B is a block diagram illustrating action-actor-attention network, according to example embodiments.

FIG. 3B is a block diagram illustrating action-actor attention network 350 according to example embodiments. In some embodiments, action-actor attention network 350 may be representative of the architecture of action-actor attention network 126. As shown, action-actor attention network 350 may be similar to action-actor attention network 350 illustrated in FIG. 2 above. However, action-actor attention network 350 may represent a skip connection action-actor model, by which a skip connection may be utilized after one or more convolutions (e.g., two convolutions).

Real-world tracking systems often miss agents for a few frames because the tracking/detection algorithm may have failed or because the agents may be out of view for a period of time. However, detecting the actions of agents in these scenarios is still desired. Accordingly, in some embodiments, action-actor attention network 350 may be trained using a training curriculum that includes removing a subset of agents during the training process to train action-actor attention network 350 to handle real-world inputs.

When training action-actor attention network 350 with missing agents (or players), the system may be able to recover much of network's 350 performance. For example, removing the most distant agent from the object (e.g., ball) during training may produce an edit distance and frame-level accuracy reasonably similar to a network trained without missing agents. In some embodiments, action-actor attention network 350 may be trained on data with two or more (e.g., three) random players removed for a subset of time (e.g., three seconds), simulating "tracks flicker." In such embodiments, there may be two or more (e.g., three) missing agents at every frame, although which agents are missing may change every subset of time (e.g., three seconds). Such training results in an action-actor attention network 350 generates consistent performance regardless of the number of players missing and not very different from the performance with no missing players. This result implies that independent streams of the proposed network 350 can be made relatively insensitive to missing data.

As illustrated, action-actor-attention network 350 may include a spatial attention sub-network 352, convolution network 354, and a mutual attention sub-network 356.

Spatial attention sub-network 352 may include one or more fully-connected layers 358 and 360 and a softmax layer 362. In some embodiments, fully-connected layer 358 may include 32 nodes or neurons. In some embodiments, fully-connected layer 360 may include 22 nodes or neurons. As illustrated, spatial attention sub-network 352 may receive, as input, XL and outputs spatial attention coefficients $\alpha_t$, regardless of the number of missing agents.

Convolution network 354 may receive, as input, a weighted spatiotemporal matrix=$a_t \odot X_C^t$ which may be fed into convolutional stream 364. In some embodiments, first convolutional layer of convolutional stream 364 may have a kernel size of 2 and a stride of 2 in the agent dimension. Thus, the dimension of the first hidden layer in stream 364 may have agent-dimension C. All subsequent convolutions in stream 314 may have an agent-dimensional kernel of 1 and agent-dimension stride of 1. As output, convolutional stream 364 may generate $z_a$ and $z_b$. $z_a$ and $z_b$ may represent latent feature representations. For example, as shown, convolutional stream 364 may include convolutional layers $364_1$-$364_5$. Convolutional layer $364_1$ may have a kernel size of 2 and a stride of 2 in the agent dimension. Accordingly, the dimension of the first convolutional layer $364_1$ may have agent-dimension C. Each of convolutional layers $364_2$-$364_5$ may have an agent-dimensional kernel of 1 and agent-dimension stride of 1. Each convolutional layer may be followed by a respective activation function 365.

Mutual attention sub-network 356 may take $z_a$ and $z_b$, as input, and combine them into a single manifold, i.e., $z=z_a \odot z_b$, where $\odot$ may denote the Hadamard product. This single manifold may be referred to as a mutual attention layer 367. Output from mutual attention layer 367 may be provided to fully connected layer 369. In some embodiments, fully connected layer 369 may include 256 layers. Mutual attention sub-network 356 may further include two separate multilayer perceptrons 368, 370. As shown, in some embodiments, each multilayer perceptron 368, 370 may receive, as input, the output from mutual attention layer 367.

The generated single manifold may be passed through both multilayer perceptron 368 and multilayer perceptron 370. For example, multilayer perceptron 368 may generate an actor prediction 380, and multilayer perceptron 370 may generate an actor prediction 382, or vice versa.

For example, as shown, multilayer perceptron 368 may include a fully connected layer $368_1$ and an activation function 371 (e.g., softmax activation); multilayer perceptron 370 may include a fully connected layer $370_1$ and an activation function 373 (e.g., softmax activation).

Figure 4:
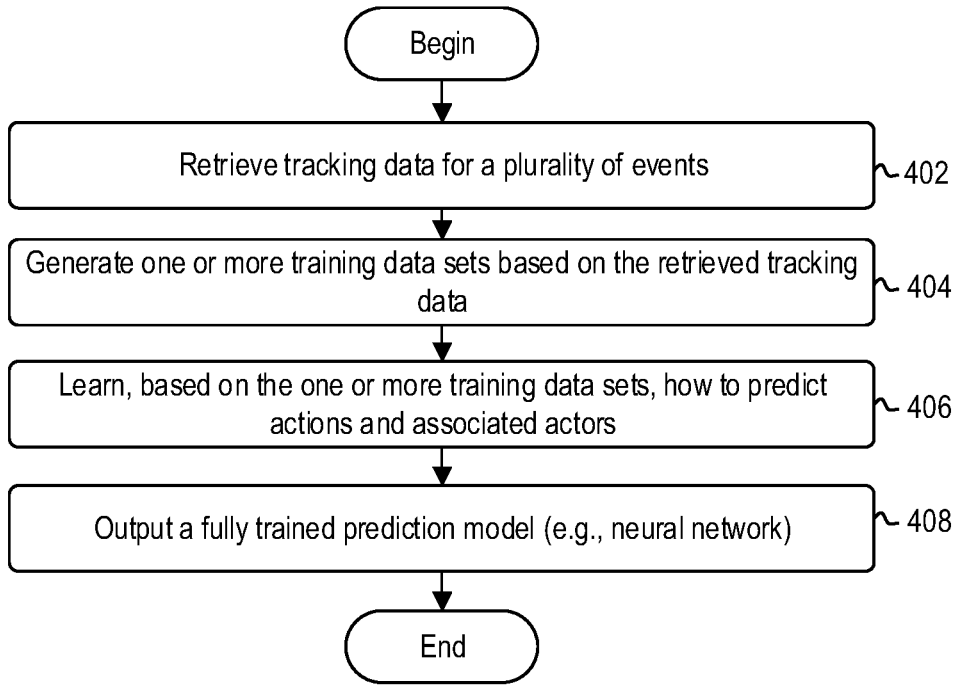
FIG. 4 is a block diagram illustrating a method of generating a fully trained prediction model, according to example embodiments.

FIG. 4 is a block diagram illustrating a method 400 of generating a fully trained prediction model, according to example embodiments. Method 400 may begin at step 402.

At step 402, organization computing system 104 may retrieve tracking data for a plurality of events. For example, pre-processing agent 116 may retrieve a data set that includes around 10,000 15-second sequences of basketball plays from the 2015/2016 NBA basketball season. In some embodiments, the segments are not fixed in length.

As step 404, organization computing system 104 may generate one or more training data sets. In some embodiments, pre-processing agent 116 may split the data set into around 7500 sequences for training and around 2500 sequences for validation. Such data sets may have been captured or obtained using one or more tracking systems 102. In some embodiments, each tracking system 102 may project the three-dimensional location of players to the overhead view of the court and use a sampling rate of about 25 Hz. Accordingly, the data set may include sequences which are about 375 frames in length, per agent. Additionally, in some embodiments, each sequence may have a set of action-actor pairs (about 11-12 on average). In some examples, the set of possible actions may be: pass, possession, dribble, shot, rebound, and background. Each actor may be encoded by a unique identifier (ID), which pre-processing agent 116 may convert to a one-hot vector per sequence. For training and testing, each action may have approximate start frames, but not end frames.

As those skilled in the art recognize, although basketball is discussed in the current example, such methodologies may be extended to any sport.

At step 406, organization computing system 104 may learn, based on the one or more training data sets, how to predict actions and actors from the tracking data. For example, as discussed above in conjunction with FIG. 2, prediction engine 120 may initialize the sub-action to action-actor mapping function S: $s(t) \rightarrow a^N$. S may then be used as a ground truth, frame-level label for sub-action prediction network (e.g., action-actor-attention network 126). Action-actor-attention network 126 may then by optimized by reducing (e.g., minimizing) the weighted cross-entropy loss between $\hat{s}(t)$ and $s(t)$, and $\hat{b}^t$ and $b^t$ defined as:

$$L = L_a + \beta L_b = -\sum_c \hat{s}(t) \log s(t) - \beta \sum_c \hat{b}^t \log b^t$$

where $\beta$ may be the weight between two tasks, $\hat{s}(t)$ may be the predicted sub-action label, and $\hat{b}^t$ may be the predicted actor label.

During the testing phase, as discussed above in conjunction with FIG. 2, prediction engine 120 may use Viterbi algorithm to decode $$\hat{a}^N = \underset{s(t):S}{\mathrm{argmax}} \prod_{t=t_0}^{t_f} p\{X_C^t \mid s(t) p\{s(t) \mid s(t-1)\},$$

where $p\{X_C^t|s(t)\}$ may be provided by a neural network (e.g., action-actor-attention network 126) and $p\{X_C^t s(t)\}p\{s(t)|s(t-1)\}$ may be estimated from the training data generated in step 404. Prediction engine 120 may use two metrics to evaluate the results: (1) mean edit distance; and (2) mean frame accuracy. In some embodiments, the mean edit distance may be calculated using the Levenshtein distance, i.e., the minimum number of single edits (e.g., insertions, deletions, or substitutions) needed (e.g., required) to transform the predicted sequence to the ground truth sequence. In some embodiments, the mean frame accuracy may be the average number of correctly predicted frames over total number of frames per sequence. For example:

$$\frac{1}{N} * \frac{1}{t_f} * \sum_N \sum_t 1(a^t = \hat{a}^t)$$

where $1(a^t=\hat{a}^t)$ may be the indicator function equal to 1, when $a^t=\hat{a}^t$ and 0 otherwise. Here, $\hat{a}^t$ may be the predicted action, $a^t$ may be the ground truth label, and N may be the total number of samples.

At step 408, organization computing system 104 may output a fully trained prediction model. For example, at the end of the training and testing processes, prediction engine 120 may have a fully trained action-actor-attention network 126.

Figure 5:
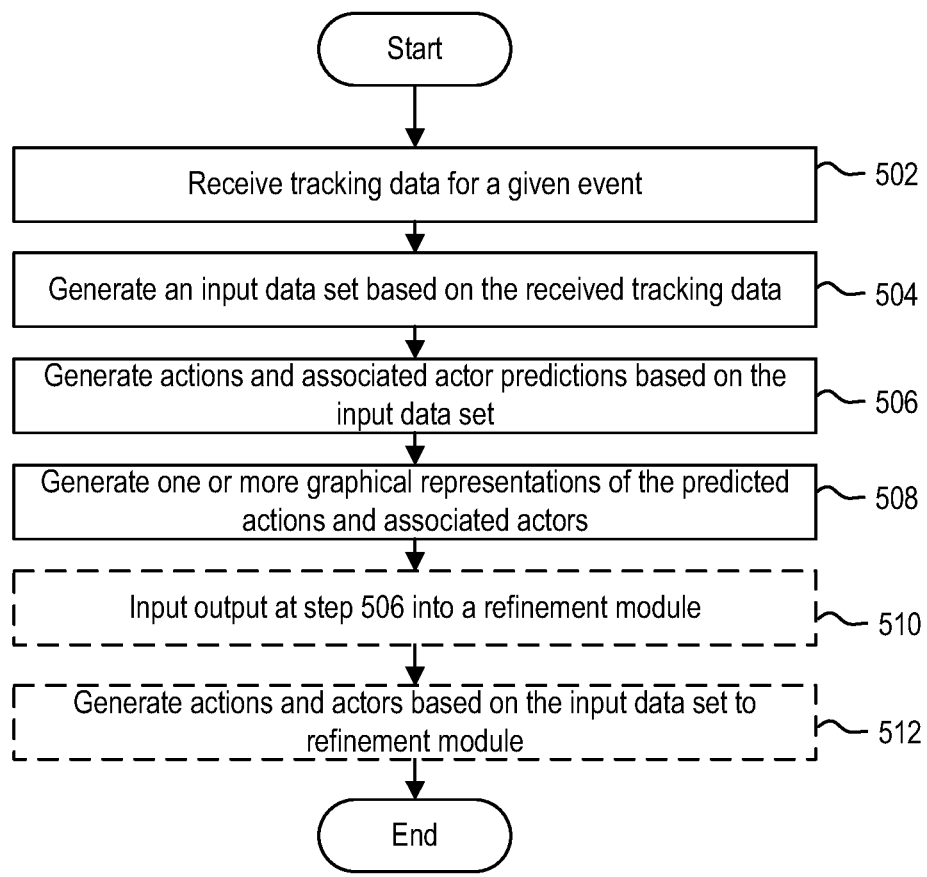
FIG. 5 is a flow diagram illustrating a method of predicting actions and actors from multi-agent tracking data, according to example embodiments.

FIG. 5 is a flow diagram illustrating a method 500 of predicting actions and actors from multi-agent tracking data, according to example embodiments. Method 500 may begin at step 502.

At step 502, organization computing system 104 may receive tracking data for a given event. For example, organization computing system 104 may receive one or more frames of video data captured by tracking system 102 in a given venue. In some embodiments, organization computing system 104 may receive tracking data from client device 108. For example, a user, via application 132, may request that an action-actor prediction be generated for a given frame (or frames) of video information.

At step 504, organization computing system 104 may generate an input data set from the tracking data. For example, pre-processing agent 116 may parse the tracking data to generate a matrix representation $X_C^t$ of the tracking data. As discussed previously, $X_C^t$ may represent the trajectories of C interacting agents over the time range $[t_0, t_f]$, where the time range represents that duration of the tracking data provided by tracking system 102 or client device 108.

At step 506, organization computing system 104 may generate actions and actors based on the input data set. For example, prediction engine 120 may generate the actions and actors prediction by inputting the input data set, $X_C^t$ into action-actor-attention network 126. Action-actor-attention network 126 may generate, as output a set of sub-actions $s(t)$ and a set of actors $b^t$.

At step 508, organization computing system 104 may generate one or more graphical representations of the actors and actions prediction.

In some embodiments, method 500 may include steps 510-512. At step 510, organization computing system 104 may input the output from prediction engine 120 at step 506 into a refinement module 125. Refinement module 125 may be configured to perform a detection, within a narrowed search space, using the segments detected or found at step 506. In some embodiments, refinement module 125 may have substantially the same architecture as prediction engine 120. For example, refinement module 125 may include an action-actor-attention network similar to action-actor-attention network 126. In some embodiments, refinement module 125 may utilize a different machine-learning based approach for further refinement and detection.

At step 512, organization computing system 104 may generate actions and actors based on the input data set to refinement module 125. For example, refinement module 125 may generate the actions and actors prediction by inputting the set of sub-actions $s(t)$ and set of actors $b^t$ into refinement module 125. Refinement module 125 may generate, as output a further set of sub-actions and a further set of actors within the narrow search space defined by the input.

Figure 7:
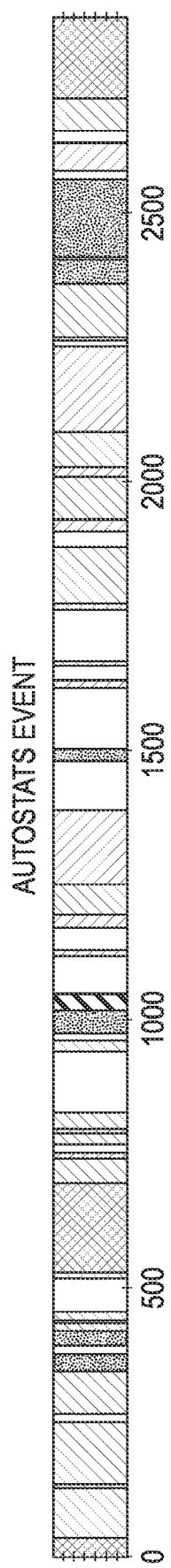
FIG. 7 is a block diagram illustrating a description of an event, according to example embodiments.

FIG. 7 is a block diagram illustrating a description of an event, according to example embodiments. In some embodiments, the x-axis represents a frame (i.e., a moment in time corresponding to a single image from a video) and each color corresponds to a specific event that is occurring during that frame. A similar visualization could be made for the actor (i.e. who is involved in the event).

Figure 6A:
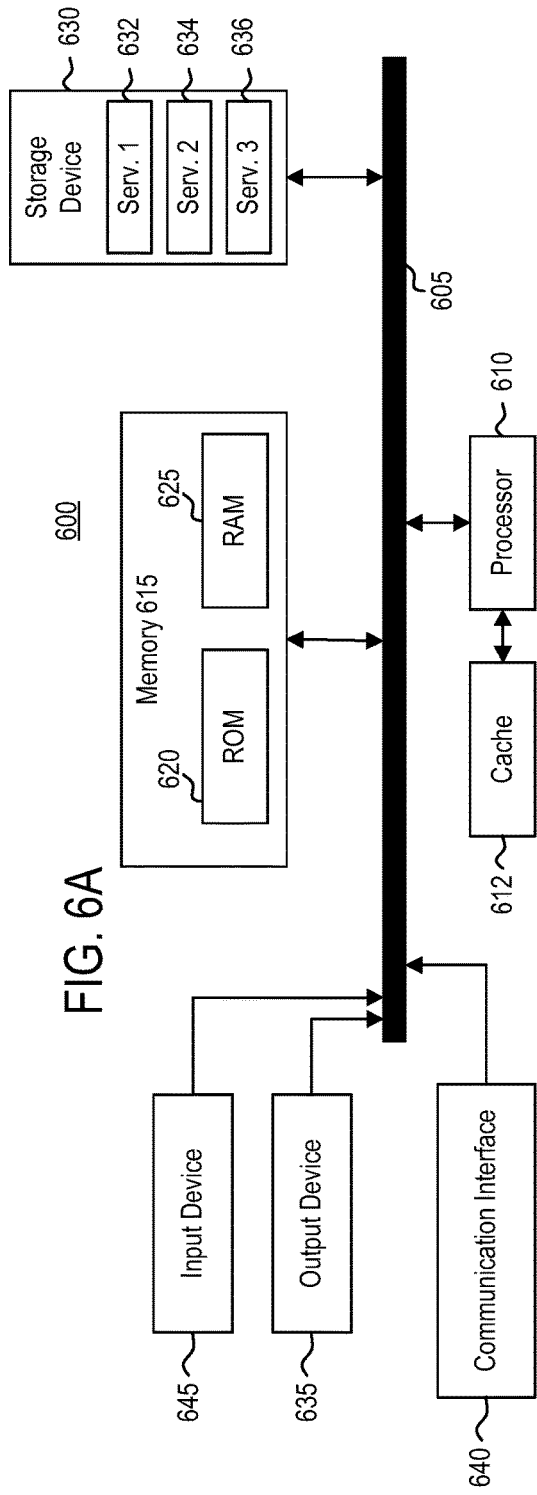
FIG. 6A is a block diagram illustrating a computing device, according to example embodiments.

FIG. 6A illustrates an architecture of computing system 600, according to example embodiments. System 600 may be representative of at least a portion of organization computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 (e.g., display) may also be one or more of a number of output mechanisms known to those of skill in the art. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

Figure 6B:
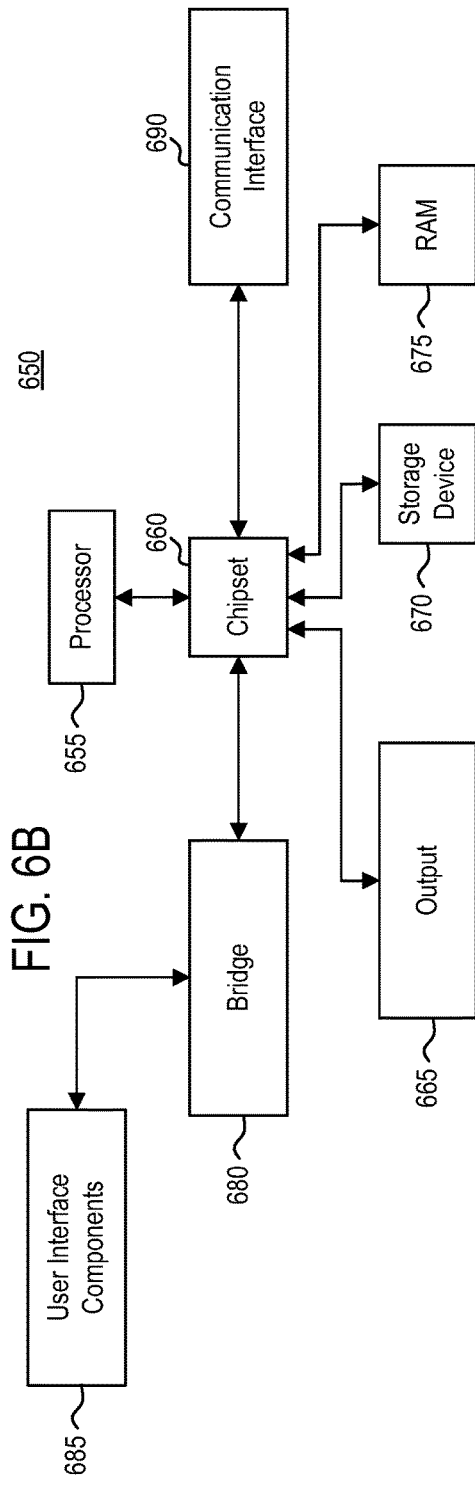
FIG. 6B is a block diagram illustrating a computing device, according to example embodiments.

FIG. 6B illustrates a computer system 650 having a chipset architecture that may represent at least a portion of organization computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid-state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or RAM 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of generating agent and actions prediction based on multi-agent tracking data, comprising:
retrieving, by a computing system, tracking data from a data store, the tracking data comprising a plurality of frames of data for a plurality of events across a plurality of seasons;
generating, by the computing system, a trained neural network, by:
generating a plurality of training data sets based on the tracking data by converting each frame of data into a matrix representation of the data contained in the frame; and
learning, by the neural network, based on the plurality of training data sets, a start frame and end frame of each action contained in the frame and its associated actor, wherein each action comprises a plurality of sub-actions of a specified duration, and wherein the learning includes initializing a sub-action to action-actor mapping function for use as a ground truth, and a frame level label for the neural network, and wherein the learning includes optimizing the neural network by reducing weighted cross entropy loss between a predicted sub-action, a predicted actor, and the ground truth;
receiving, by the computing system, target tracking data associated with an event, the target tracking data comprising a plurality of actors and a plurality of actions;
converting, by the computing system, the tracking data into a matrix representation of the tracking data, wherein the matrix representation includes one or more relationships between one or more agents and one or more periods of time;
predicting, by the computing system via the trained neural network, a target start frame and a target end frame of each action identified in the tracking data and an associated actor; and
presenting, by the computing system, the predicted target start frame, predicted target end frame, and predicted associated actor to one or more end users.

2. The method of claim 1, wherein the neural network comprises:
a spatial attention sub-network;
a per-agent convolution network comprising parallel convolutional streams; and
a mutual attention sub-network comprising a first multilayer perceptron and a second multilayer perceptron.

3. The method of claim 2, wherein generating, by the computing system via the trained neural network, the target start frame and the target end frame of each action identified in the tracking data and a corresponding actor; comprises:
inputting the matrix representation of the tracking data into the spatial attention sub-network to generate spatial attention coefficients.

4. The method of claim 3, further comprising:
generating a weighted spatiotemporal matrix by multiplying the matrix representation of the tracking data by the spatial attention coefficients; and
inputting the weighted spatiotemporal matrix into a first convolutional stream of the parallel convolutional streams and a second convolutional stream of the parallel convolutional streams.

5. The method of claim 4, further comprising:
combining, by the mutual attention sub-network, a first output from the first convolutional stream and a second output from the second convolutional stream to generate a mutual attention layer; and
passing the mutual attention layer through the first multilayer perceptron to generate an action prediction; and
passing the mutual attention layer through the second multilayer perceptron to generate an actor prediction.

6. The method of claim 1, wherein the target tracking data comprises raw positional data for the plurality of actors.

7. The method of claim 6, further comprising:
annotating, by the computing system, the raw positional data for the plurality of actors with player position information.

8. The method of claim 6, further comprising:
fusing, by the computing system, the raw positional data for the plurality of actors with manually annotated tracking data.

9. The method of claim 1, further comprising:
inputting, by the computing system, the predicted target start frame, the predicted target end frame, and the predicted associated actor into a refinement module; and
generating, by the computing system via the refinement module, a refined predicted target start frame, a refined predicted target end frame, and a refined predicted associated actor.

10. A system for generating agent and actions prediction based on multi-agent tracking data, comprising:
a processor; and
a memory having programming instructions stored thereon, which, when executed by the processor, performs one or more operations, comprising:
retrieving tracking data from a data store, the tracking data comprising a plurality of frames of data for a plurality of events across a plurality of seasons;
generating a trained neural network, by:
generating a plurality of training data sets based on the tracking data by converting each frame of data into a matrix representation of the data contained in the frame; and
learning, by the neural network, based on the plurality of training data sets, a start frame and end frame of each action contained in the frame and its associated actor, wherein each action comprises a plurality of sub-actions of a specified duration, and wherein the learning includes initializing a sub-action to action-actor mapping function for use as a ground truth, and a frame level label for the neural network, and wherein the learning includes optimizing the neural network by reducing weighted cross entropy loss between a predicted sub-action, a predicted actor, and the ground truth;
receiving target tracking data associated with an event, the target tracking data comprising a plurality of actors and a plurality of actions;
converting the tracking data into a matrix representation of the tracking data, wherein the matrix representation includes one or more relationships between one or more agents and one or more periods of time;
predicting, via the trained neural network, a target start frame and a target end frame of each action identified in the tracking data and an associated actor; and
presenting the predicted target start frame, the predicted target end frame, and the predicted associated actor to one or more end users.

11. The system of claim 10, wherein the neural network comprises:
a spatial attention sub-network;
a per-agent convolution network comprising parallel convolutional streams; and
a mutual attention sub-network comprising a first multilayer perceptron and a second multilayer perceptron.

12. The system of claim 11, wherein generating, via the trained neural network, the target start frame and the target end frame of each action identified in the tracking data and the associated actor, comprises:
inputting the matrix representation of the tracking data into the spatial attention sub-network to generate spatial attention coefficients.

13. The system of claim 12, further comprising:
generating a weighted spatiotemporal matrix by multiplying the matrix representation of the tracking data by the spatial attention coefficients; and
inputting the weighted spatiotemporal matrix into a first convolutional stream of the parallel convolutional stream and a second convolutional stream of the parallel convolutional stream.

14. The system of claim 13, further comprising:
combining, by the mutual attention sub-network, a first output from the first convolutional stream and a second output from the second convolutional stream to generate a mutual attention layer;
passing the mutual attention layer through the first multilayer perceptron to generate an action prediction; and
passing the mutual attention layer through the second multilayer perceptron to generate an actor prediction.

15. A non-transitory computer readable medium including one or more sequences of instructions that, when executed by one or more processors, causes:
retrieving, by a computing system, tracking data from a data store, the tracking data comprising a plurality of frames of data for a plurality of events across a plurality of seasons;

generating, by the computing system, a trained neural network, by:
  generating a plurality of training data sets based on the tracking data by converting each frame of data into a matrix representation of the data contained in the frame; and
  learning, by the neural network, based on the plurality of training data sets, a start frame and end frame of each action contained in the frame and its associated actor, wherein each action comprises a plurality of sub-actions of a specified duration, and wherein the learning includes initializing a sub-action to action-actor mapping function for use as a ground truth, and a frame level label for the neural network, and wherein the learning includes optimizing the neural network by reducing weighted cross entropy loss between a predicted sub-action, a predicted actor, and the ground truth;
receiving, by the computing system, target tracking data associated with an event, the target tracking data comprising a plurality of actors and a plurality of actions;
converting, by the computing system, the tracking data into a matrix representation of the tracking data, wherein the matrix representation includes one or more relationships between one or more agents and one or more periods of time;
predicting, by the computing system via the trained neural network, a target start frame and a target end frame of each action identified in the tracking data and an associated actor; and
presenting, by the computing system, the target start frame, the target end frame, and the associated actor to one or more end users.

16. The non-transitory computer readable medium of claim 15, wherein the neural network comprises:
  a spatial attention sub-network;
  a per-agent convolution network comprising parallel convolutional streams; and
  a mutual attention sub-network comprising a first multilayer perceptron and a second multilayer perceptron.

17. The non-transitory computer readable medium of claim 16, further comprising:
  generating, by the computing system, a weighted spatiotemporal matrix by multiplying the matrix representation of the tracking data by spatial attention coefficients; and
  inputting, by the computing system, the weighted spatiotemporal matrix into a first convolutional stream of the parallel convolutional streams and a second convolutional stream of the parallel convolutional streams.

18. The non-transitory computer readable medium of claim 17, further comprising:
  combining, by the mutual attention sub-network, a first output from the first convolutional stream and a second output from the second convolutional stream to generate a mutual attention layer;
  passing the mutual attention layer through the first multilayer perceptron to generate an action prediction; and
  passing the mutual attention layer through the second multilayer perceptron to generate an actor prediction.

19. The non-transitory computer readable medium of claim 15, wherein the target tracking data comprises raw positional data for the plurality of actors.

20. The non-transitory computer readable medium of claim 19, further comprising:
  annotating, by the computing system, the raw positional data for the plurality of actors with player position information.

* * * * *